United States Patent

Gras

[11] Patent Number: 6,166,164
[45] Date of Patent: Dec. 26, 2000

[54] BLOCKED POLYISOCYANATES, A PROCESS FOR THEIR PREPARATION, AND THEIR USE

[75] Inventor: Rainer Gras, Bochum, Germany

[73] Assignee: Huels Aktiengesellschaft, Marl, Germany

[21] Appl. No.: 09/407,061

[22] Filed: Sep. 28, 1999

Related U.S. Application Data

[63] Continuation of application No. 08/867,336, Jun. 2, 1997, Pat. No. 6,051,675.

[30] Foreign Application Priority Data

Jul. 4, 1996 [DE] Germany .......................... 196 26 886

[51] Int. Cl.$^7$ .................................................. C08G 18/10
[52] U.S. Cl. ............................... 528/45; 528/59; 528/73; 525/124; 525/440
[58] Field of Search ................. 528/45, 59, 73; 525/440, 124

[56] References Cited

U.S. PATENT DOCUMENTS

| | | | |
|---|---|---|---|
| 4,482,721 | 11/1984 | Wegner | 548/262 |
| 4,500,696 | 2/1985 | Gras | 528/45 |
| 4,500,697 | 2/1985 | Disteldorf | 528/45 |
| 4,578,426 | 3/1986 | Lenz et al. | 525/131 |
| 5,691,438 | 11/1997 | Konig et al. | 528/45 |
| 5,691,440 | 11/1997 | Katz et al. | 528/52 |

FOREIGN PATENT DOCUMENTS

| | | |
|---|---|---|
| 0004571 A1 | 10/1979 | European Pat. Off. . |
| 0129813 A2 | 1/1985 | European Pat. Off. . |
| 0579042 A2 | 1/1994 | European Pat. Off. . |
| 3322718 A1 | 1/1985 | Germany . |
| WO 9323447 | 11/1993 | WIPO . |

*Primary Examiner*—Rachel Gorr
*Attorney, Agent, or Firm*—Oblon, Spivak, McClelland, Maier & Neustadt, P.C.

[57] ABSTRACT

Partially or totally blocked polyisocyanates comprising physical mixtures of individual a) urethane-functional and/or
b) biuret-functional and/or
c) isocyanurate-functional aliphatic and (cyclo)aliphatic and/or cycloaliphatic diisocyanate whose isocyanate groups are blocked in such a way that there is from 0.5 to 1 mol, preferably from 0.8 to 1 mol, of 1,2,4-triazole per isocyanate equivalent.

9 Claims, No Drawings

BLOCKED POLYISOCYANATES, A PROCESS FOR THEIR PREPARATION, AND THEIR USE

This application is a continuation of U.S. Ser. No. 08/867,336, filed Jun. 2, 1997, and issued as U.S. Pat. No. 6,051,675.

BACKGROUND OF THE INVENTION

1. Field of the Invention

The present invention relates to novel partially or totally blocked polyisocyanates with a high latent isocyanate content and high reactivity, to a process for their preparation, and to their use for producing polyurethane (PU) polymers, especially heat-curable PU coating systems, and, with particular preference, low temperature-curable PU powder coatings, and to the coatings produced accordingly.

2. Discussion of the Background

Heat-curable PU powder coatings based on partially or totally blocked polyisocyanates and hydroxyl-containing polymers, whose softening point is above 40° C., are widely described in the literature, such as in the DE-A documents 21 05 777, DE-25 42 191, DE- 27 35 497 (U.S. Pat. No. 4,246,380), DE-28 42 641, DE-30 04 876, DE-30 39 824 and DE-31 28 743.

PU powder coatings consist essentially of a hydroxyl-containing component and a polyisocyanate, whose NCO groups are partially or completely masked with a blocking agent, so that the OH/NCO polyaddition reaction is unable to begin at temperatures below 140° C. Only after heating them to ≧150° C. is it possible to crosslink such PU powder coatings, to form a coating film within a practical period of time, with removal of the blocking agent and reaction of the OH groups with the NCO groups.

From the large number of blocking agents, described in Houben-Weyl, Methoden der organischen Chemie [Methods of organic chemistry], Volume XIV/2, 4th Edition, Georg Thieme Verlag, Stuttgart 1963, pages 61–70, only ε-caprolactam has become established in the industry for the intended use of the blocked polyisocyanates in the PU powder coating sector.

To crosslink the coating, PU powder coatings based on ε-caprolactam-blocked polyisocyanates require curing temperatures of between 170 and 200° C.

There is therefore great interest in reducing the high curing temperatures so as to open up powder technology for temperature-sensitive workpieces. Likewise, of interest is the reduction of the curing times, in order to make it possible to increase the production rates (piece rates). Consequently, both environmental and economic factors are important.

Attempts have been made to achieve these aims by using oxime-blocked (cyclo)aliphatic polyisocyanates. For example, oxime-blocked polyisocyanates and their use in PU powder coatings are described in DE-A 22 00 342, EP-A 0 432 257 and U.S. Pat. No. 3,857,818. EP-B 0 401 343 describes PU powders comprising, as hardener component, an acetone oxime-blocked trimethylolpropanetetramethylxylylene diisocyanate. EP-B 0 409 745 specifies, as PU powder hardeners, 2,4-dimethyl-3-pentanone oxime- and/or 2,6-dimethyl-4-heptanone oxime-blocked isocyanurates of isophorone diisocyanate (IPDI), of methylene-bis-4,4'-cyclohexyl isocyanate and of m- and p-tetramethylsiylylene diisocyanate.

EP-B 0 531 862 relates to a process for preparing powder coatings with a glass transition temperature of 20–80° C. by mixing A) a polyol component, B) a ketoxime-blocked polyisocyanate, C) a catalyst component, consisting of at least one catalyst for the reaction between blocked NCO groups and hydroxyl groups, and optionally D) further additives and auxiliaries known for powder coating technology, the powder coatings being prepared by dissolving components A, B, C and, if used, D homogeneously in an inert solvent or solvent mixture having a boiling point or boiling range between 50 and 150° C., and then removing the solvent from the resulting solution.

Using oxime-blocked polyisocyanates, it is in fact possible to prepare PU powder coatings whose curing temperatures are at a low level. However, a distinction must be made between transparent and pigmented coatings. The relatively high thermal instability of such PU powder coatings is a disadvantage; the coatings have a tendency toward yellowing. A further disadvantage is the high level of susceptibility to defects ranging from pinholing to foaming, with the result that PU powder coatings containing oxime-blocked polyisocyanate are of restricted utility and can be employed only for thin-film coating.

DE-A 28 12 252 describes 1,2,4-triazole-blocked polyisocyanates which are employed in PU powder coatings—"they surprisingly bring about further improvement of the powder coating binders of the prior art". These are 1,2,4-triazole-blocked diisocyanates and/or polyisocyanates thereof which carry urethane groups.

In the description of DE-A 30 33 860 ≙, EP 0 047 452 it is stated from page 2, line 29 to page 3, line 6 that the blocked isocyanatoisocyanurate of hexamethylene diisocyanate (HDI) is unsuitable for use in PU powder coatings. An exception is constituted by the blocked isocyanatoisocyanurate of isophorone diisocyanate (IPDI). As EP 0 047 452 goes on to show, it is possible by mixed trimerization of these two polyisocyanates (HDI/IPDI) to prepare products which, in their blocked form (cf. page 8, lines 16–21), are suitable for the PU powder coating sector, albeit with no experimental proof given. Reference is made to the variability of the melting range as a function of the HDI/IPDI molar ratios employed; increased solvent compatibility, low-temperature flexibility, etc are mentioned—cf. page 3, lines 19–21.

DE-A 33 22 718 described blocked isocyanato isocyanurates of 2-methylpentamethylene diisocyanate/2-ethylbutylene diisocyanate, and IPDI co-trimers or mixtures, HDI/IPDI co-trimers or mixtures thereof serve merely for comparison.

The object of the present invention is therefore to overcome the disadvantages of the prior art and to provide novel partially or totally blocked polyisocyanates which permit the preparation of both transparent and pigmented PU powder coatings which are notable for high reactivity, i.e., curing at low temperatures, and which therefore make it possible to obtain—with film thicknesses in the range of those encountered in practice—coatings which are free from pinholing and yellowing and are flexible despite their high network density.

SUMMARY OF THE INVENTION

The present invention therefore provides partially or totally blocked polyisocyanates comprising physical mixtures of individual a) urethane-functional and/or b) biuret-functional and/or c) isocyanurate-functional aliphatic and (cyclo)aliphatic and/or cycloaliphatic diisocyanates whose isocyanate groups are blocked in such a way that there is from 0.5 to 1 mol, preferably from 0.8 to 1 mol, of 1,2,4-triazole per NCO equivalent. The polyisocyanates employed in accordance with the invention are physical mixtures of individual urethanes, biurets and isocyanurates, which are employed in the proportions stated.

DETAILED DESCRIPTION OF THE PREFERRED EMBODIMENTS

Compounds to be regarded as polyisocyanates in the context of this application are, in particular, diisocyanates of aliphatic and (cyclo)aliphatic and/or cycloaliphatic structures. Specific polyisocyanates are described in Houben-Weyl, Methoden der organischen Chemie [Methods of organic chemistry], volume 14/2 p. 61 ff. and J. Liebigs Annalen der Chemie, Volume 562, pp. 75–136, the relevant portions of which, which describe polyisocyanates, are hereby incorporated by reference polyisocyanates. In general, use is preferably made of those diisocyanates which are readily available industrially, including aliphatic diisocyanates such as hexamethylene diisocyanate, (cycle) aliphatic diisocyanates such as isophorone diisocyanate (IPDI), and cycloaliphatic diisocyanates such as 4,4'-diisocyanatodicyclohexylmethane (HMDI).

The novel physical mixtures comprises an aliphatic isocyanate component and at least one representative from the group consisting of (cyclo)aliphatic and cycloaliphatic isocyanate components. Among (cyclo)-aliphatic diisocyanats with isocyanate groups attached simultaneously to aliphatic and cycloaliphatic structures, an example is IPDI. In contrast, cycloaliphatic diiscoyanates are understood as being those which carry only isocyanate groups attached directly to the cycloaliphatic ring. The ratio of aliphatic to (cyclo)aliphatic and/or cycloaliphatic diisocyanates may varry from 90:10 to 10:90% by weight, preferably from 75:25 to 25:75% by weight, in particular from 60:40 to 40:60% by weight.

The trimers may be prepared by conventional methods known to those of ordinary skill in the art, such as those described in GB-B 1 391 066, DE-A 23 25 826, DE-26 44 684 and DE-29 16 201.

The biurets may be prepared by conventional methods known to those of ordinary skill in the art, such as those described in DE-A 23 08 015, 24 37 130 and 30 07 679.

Finally, polyisocyanates in the context of the present invention are also to be understood as being those adducts which are obtained by reacting the abovementioned monomeric, predominantly bifunctional polyisocyanates with the chain extenders which are common in isocyanate chemistry. Compounds of this kind are listed, for example, in DE-A 27 07 770. Preference is given to polyols whose molecular weight is below 350, especially ethylene glycol (E) and trimethylolpropane (TMP). The chain extenders should be reacted with the polyisocyanates only in quantities which are such that the resulting adduct has on average at least two isocyanate groups.

The novel physical mixtures comprises in each case of an aliphatic urethane-and/or biuret- and/or isocyanurate-functional isocyanate component and at least one representative from the group consisting of (cyclo)aliphatic urethane- and/or isocyanurate-functional isocyanate components and/or one representative from the groups consisting of cycloaliphatic urethane- and/or isocyanurate-functional isocyanate components.

From among the large number of physical mixtures which can be prepared in accordance with the invention, the pure isocyanurate mixtures are not a subject of this invention.

The process products comprises, consequently, of urethanes and/or biurets and/or isocyanurates together if appropriate with higher oligomers, having an NCO content of from 8 to 22% by weight, preferably from 10 to 21.5% by weight, which is reduced by blocking with 1,2,4-triazole to a free NCO content of $\leq 5\%$ by weight, preferably $\leq 3\%$ by weight, in particular $\leq 2\%$ by weight.

The NCO group/blocking ratio is, in accordance with the invention, 1:0.5 to 1, preferably 1:0.8 to 1.

In accordance with the invention, the latent NCO content of the 1,2,4-triazole-blocked polyisocyanates is 7–118% by weight, preferably 10–16% by weight.

The novel preparation of the partially or totally blocked physical mixtures (polyisocyanates) can be carried out either in solvents or in bulk, and discontinuously in a reactor or continuously in a static mixer or, advantageously, in a multiscrew extruder, especially a twin-screw extruder.

Suitable solvents are only those which do not react with the polyisocyanates, examples being ketones, such as acetone, methyl ethyl ketone, methyl isobutyl ketone, cyclopentanone and cyclohexanone; aromatic compounds, such as toluene, xylene, chlorobenzene and nitrobenzene; cyclic ethers, such as tetrahydrofuran; esters, such as methyl acetate and n-butyl acetate; alphatic chlorinated hydrocarbons, such as chloroform and carbon tetrachloride; aprotic solvents, such as dimethylformamide, dimethylacetamide and dimethyl sulfoxide; and solvents which are customarily used for solvent-containing PU coating systems.

The reaction of the polyisocyanate with the 1,2,4-triazole is usually conducted in the temperature range between 0 and 150° C. In order to carry out blocking rapidly and completely, relatively high reaction temperatures are preferred. On the other hand, the reaction temperature must be at least 10° C. below the deblocking temperature of the blocked polyisocyanate. Preference is given to the temperature range which lies about 15 to 25° C. below the deblocking temperature, i.e. approximately from 115 to 120° C.

In the blocking reaction it is possible for catalysts to be present which favor the isocyanate polyaddition reaction, examples being tin(II) octoate, dibutyltin dilaurate (DBTL), tertiary amines etc.

The present invention additionally provides for the use of the novel compounds for producing PU polymers, especially heat-curable solvent-containing one-component PU coating systems, and very preferably low temperature-curable PU powder coatings, and the coatings produced accordingly.

The invention additionally provides for the use of the compositions as powder coatings or as binders for powder coatings for the coating of any desired heat-curable substrates, especially heat-sensitive workpieces, by coating methods which are known per se and are suitable for the processing of powder coatings. Owing to their high reactivity (low curing temperatures) and their excellent leveling properties, the transparent PU powder coatings are particularly suitable as a topcoat, especially as an automotive topcoat.

Powder coatings of this kind constitute a composition comprising polyisocyanates blocked in accordance with the invention, a hydroxyl-containing polymer, and optionally, customary auxiliaries and additives.

Particularly suitable hydroxyl-containing polymers are polyesters, epoxy resins and hydroxyl-containing acrylates having a molecular weight of from 800 to 40,000.

Compounds suitable for preparing the powder coatings are preferably the polyesters of terephthalic acid with the alcohols 1,6-hexanediol (HD), neopentyl glycol (NPG), 1,4-dimethanolcyclohexane (DMC) and 2,2,2-trimethylolpropane.

Non-limiting examples of the epoxy resins which can be employed are listed in DE-A 29 45 113, page 12, line 1 to page 13, line 26.

Non-limiting examples of suitable polyacrylate resins are described in DE-A 30 30 539, page 14, line 21 to page 15, line 26.

The mixing ratio can be varied within wide limits. The best coatings-related characteristics are obtained if the binder ratio consists of 9–45% by weight crosslinking agent and 55–91% by weight polyester, it being possible to establish an OH/NCO ratio of 1:0.6–1:1.2, preferably 1:0.9–1:1.1. It is particularly advisable to employ one equivalent of NCO of the crosslinking agent per OH equivalent of the polyhydroxy compound.

In order to raise the gelling rate of the heat-curable powder coatings it is possible to add catalysts. Catalysts used are organotin compounds, such as dibutyltin dilaurate, Sn(II) octoate, dibutyltin maleate, etc. The amount of catalyst added is 0.1–5 parts by weight per 100 parts by weight of the hydroxyl-containing polyester.

For the preparation of PU powder coatings, the isocyanate component is mixed with the appropriate hydroxyl-containing polymer and, if desired, catalysts and also pigments and customary auxiliaries, such as fillers and leveling agents, for example silicone oil, acrylate resins, and the mixture is homogenized in the melt. This can be done in appropriate equipment, such as a heatable kneading apparatus, but preferably by extrusion, aiming not to exceed an upper temperature limit of 120° C. The extruded mass is cooled to room temperature, suitably comminuted and then ground to give the ready-to-spray powder. The application of this powder to appropriate substrates can be carried out in accordance with known techniques, for example electrostatic powder spraying, fluidized-bed sintering, and electrostatic fluidized-bed sintering. Following the application of the powder, the coated workpieces are cured in between 60 and 4 minutes by bringing them to a temperature of from 130 to 200° C., preferably in between 25 and 5 minutes at from 140 to 180° C.

Coating with the novel pulverulent coating compositions can suitably be performed on all substrates which withstand the abovementioned curing conditions without any impairment of their mechanical properties, for example metals, glass, ceramic, plastic or wood.

In comparison with their conventional counterparts, the PU powder coatings obtained feature an improved behavior toward heat, UV and chemical influences; the transparent coatings exhibit excellent leveling, in particular.

Having generally described this invention, a further understanding can be obtained by reference to certain specific examples which are provided herein for purposes of illustration only and are not intended to be limiting unless otherwise specified.

EXPERIMENTAL SECTION

A. Preparation of the 1,2,4-Triazole-Blocked Urethane-and/or Biuret-and/or Isocyanurate-Functional Polyisocyanates General Preparation Procedure The physical mixtures employed in accordance with Table 1 were homogenized at 100–120° C. in a double-walled reactor. Prior to the addition of the 1,2,4-triazole, the NCO content of the melt was checked titrimetrically and then the calculated amount of 1,2,4-triazole was added in portions at a rate such that the reaction temperature does not exceed 130° C. Following the addition of 1,2,4-triazole, the reaction product is stirred at 120° C. until the NCO content has fallen below the calculated value, or <0.5% by weight.

If dibutyltin dilaurate (DBTL) is used, optionally, to accelerate the reaction, it is added following isocyanate homogenization and prior to the addition of the blocking agent.

Use is made of the following industrially available products:

a) Isocyanurates, for example from
   A) Hüls AG NCO content 17.3±0.3% weight VESTANAT T 1890
   B) Bayer AG NCO content: 21.8±0.3% by weight DESMODUR N 3300
   C) The laboratory product W 1600 made from 4,4'-diisocyanatodicyclohexyl methane (HMDI) NCO content: 12.6±0.3% by weight b) The biuret, for example from
   D) Bayer AG NCO content: 21.8±0.3% by weight DESMODUR N 3200 c) The urethane-functional polyisocyanates, consisting of:

| Designation | Diisocyanate [mol] | OH component [mol] | NCO [%] |
|---|---|---|---|
| E | 2 IPDI | E | 16.1 ± 0.3 |
| F | 3 IPDI | TMP | 15.2 ± 0.3 |
| G | 2 HMDI | E | 13.7 ± 0.3 |
| H | 3 HMDI | TMP | 13.0 ± 0.3 |

Preparation was carried out in accordance with known methods in PU chemistry.

TABLE 1.1.2.4

Triazole-Blocked Isocyanate Mixtures

| | | | | | | Chemical and Physical Characteristics | | | |
|---|---|---|---|---|---|---|---|---|---|
| | | Composition [% by wt.] | | | | | | | Glass |
| | | Polyioscyanates | | | | NCO Content | | Melting | Transition |
| | | NCO | | | 1,2,4- | [% by weight] | | Range | Temperature |
| Example A | Designation | [%] | | Amount | Triazole | Free | Total | [° C.] | [° C.] |
| 1 | A D | — | | 18.2 | 77.0 | 23.0 | 0.5 | 13.9 | 104–107 | 74–90 |
| 2 | A D | — | | 19.2 | 76.0 | 24.0 | 0.4 | 14.3 | 83–89 | 49–59 |
| 3 | A D | — | | 19.2 | 77.9 | 22.1 | 1.7 | 14.9 | 77–80 | 47–62 |

TABLE 1.1.2.4-continued

Triazole-Blocked Isocyanate Mixtures

| | | | | | | | Chemical and Physical Characteristics | | | |
|---|---|---|---|---|---|---|---|---|---|---|
| | Composition [% by wt.] | | | | | | | | | Glass |
| | Polyisocyanates | | | | | | NCO Content | | Melting | Transition |
| | NCO | | | | | 1,2,4- | [% by weight] | | Range | Temperature |
| Example A | Designation | | | [%] | Amount | Triazole | Free | Total | [° C.] | [° C.] |
| 4 | A | D | — | 19.7 | 75.5 | 24.5 | 0.6 | 14.7 | 68–71 | 44–58 |
| 5 | C | D | — | 14.2 | 81.1 | 18.9 | 0.4 | 11.3 | 93–97 | 57–69 |
| 6 | C | D | — | 16.2 | 79.0 | 21.0 | 0.5 | 12.4 | 75–77 | 44–57 |
| 7 | E | B | — | 17.5 | 77.6 | 22.4 | 0.5 | 13.1 | 94–97 | 58–69 |
| 8 | E | B | — | 19.0 | 76.2 | 23.8 | 0.6 | 14.2 | 62–65 | 22–34 |
| 9 | F | B | — | 17.4 | 77.7 | 22.3 | 0.5 | 13.2 | 83–86 | 48–60 |
| 10 | F | B | — | 18.6 | 76.6 | 23.4 | 0.6 | 14.0 | 65–68 | 34–54 |
| 11 | E | D | — | 17.7 | 77.5 | 22.5 | 0.6 | 13.6 | 81–84 | 45–62 |
| 12 | E | D | — | 17.7 | 80.9 | 19.1 | 2.3 | 14.0 | 81–84 | 47–59 |
| 13 | F | D | — | 17.6 | 77.5 | 22.5 | 0.6 | 13.3 | 79–82 | 46–61 |
| 14 | G | B | — | 15.6 | 74.1 | 25.9 | 0.5 | 12.0 | 72–75 | 41–57 |
| 15 | H | B | — | 15.1 | 80.1 | 19.9 | 0.5 | 11.9 | 77–80 | 37–54 |
| 16 | H | B | — | 14.2 | 82.9 | 17.1 | 1.4 | 11.5 | 71–76 | 33–52 |
| 17 | G | D | — | 15.0 | 80.3 | 19.7 | 0.4 | 11.7 | 81–83 | 44–59 |
| 18 | G | D | — | 15.7 | 79.4 | 20.6 | 0.5 | 12.1 | 66–70 | 36–51 |
| 19 | H | D | — | 15.2 | 79.9 | 20.1 | 0.5 | 11.9 | 72–76 | 40–57 |
| 20 | A | B | E | 18.7 | 76.5 | 23.5 | 0.4 | 14.0 | 85–90 | 48–61 |
| 21 | A | B | F | 19.3 | 75.9 | 24.1 | 0.4 | 14.1 | 88–94 | 52–66 |
| 22 | A | D | F | 18.7 | 76.5 | 23.5 | 0.6 | 13.9 | 80–84 | 45–58 |
| 23 | A | B | H | 17.8 | 77.3 | 22.7 | 0.5 | 13.6 | 86–91 | 51–64 |
| 24 | A | D | H | 17.9 | 77.2 | 22.8 | 0.4 | 13.8 | 90–93 | 52–68 |
| 25 | B | F | G | 17.1 | 78.1 | 21.9 | 0.5 | 13.0 | 73–77 | 42–58 |
| 26 | D | E | H | 17.0 | 78.1 | 21.9 | 0.5 | 13.1 | 70–74 | 39–55 |

Polyol Component

General Preparation Procedure

The starting components—terephthalic acid (TA), dimethyl terephthalate (DMT), 1,6-hexanediol (HD), neopentyl glycol (NPG), 1,4-dimethylolcyclohexane (DMC) and trimethylolpropane (TMP)—are placed in a reactor and heated with the aid of an oil bath. After the substances have mostly melted, 0.5% by weight of di-n-butyltin oxide is added as catalyst at a temperature of 160° C. Initial elimination of methanol takes place at a temperature of about 170° C. Over the course of from 6 to 8 hours, the temperature is raised to 220–230° C., and the reaction is taken to completion over the course of a further 12 to 15 hours. The polyester is cooled to 200° C. and is largely free from volatile constituents by application of a vacuum (1.33 mbar) over from 30 to 45 minutes. Throughout the reaction period, the bottom product is stirred and a gentle stream of $N_2$ is passed through the reaction mixture.

Table 2 gives polyester compositions and commercial polyesters with the corresponding physical and chemical characteristics.

TABLE 2

| | Starting Components | | | | | | Chemical and Physical Characteristics | | | | Viscosity |
|---|---|---|---|---|---|---|---|---|---|---|---|
| Example B | TA [mol] | DMT [mol] | HD [mol] | NPG [mol] | DMC [mol] | TMP [mol] | OH Number [mgKOH/g] | Acid Number [mgKOH/g] | m.p. [° C.] | DTA [° C.] | at 160° C. [mPa · s] |
| 1 | 10 | 10 | 6.25 | 10.5 | 2 | 2.9 | 55–60 | 3–4 | about 75 | about 50 | ≈25,000 |
| 2 | CRYLCOAT ® 2392 UCB/Belgium | | | | | | 27–33 | 2–3 | 85–100 | >50 | ≈35,000 |
| 3 | URALAC ®P 1460 DSM/Netherlands | | | | | | 38–41 | 4–4.5 | 70–75 | >50 | 40,000 |
| 4 | ALFTALAT ®AN 739 Hoechst/Italy | | | | | | 55–60 | 2–4 | 82–90 | >50 | 24–29,000 |

C. Polyurethane Powder Coatings

General Preparation Procedure

The comminuted products—blocked polyisocyanates (crosslinking agents), polyesters, leveling agent masterbatch and, if used, catalyst masterbatch are intimately mixed, together if appropriate with the white pigment, in an edge runner mill and the mixture is subsequently homogenized in an extruder at up to a maximum of 130° C. After it has cooled, the extrudate is crushed and ground to a particle size <100 μm using a pinned-disk mill. The resulting powder is applied to degreased, optionally pretreated iron panels using an electrostatic powder spraying unit at 60 kV, and the panels are baked in a drying oven at temperatures between 140 and 180° C.

Leveling Agent Masterbatch

10% by weight of the leveling agent—a commercially available copolymer of butyl acrylate and 2-ethylhexyl acrylate—is homogenized in the melt in the corresponding polyester, and the melt is comminuted after it has solidified.

Catalyst Masterbatch

5% by weight of the catalyst—DBTL—is homogenized in the melt in the corresponding polyester, and the melt is comminuted after it has solidified.

The abbreviations in the tables below have the following meanings:

LT=Layer thickness in μm
EI=Erichsen indentation in mm (DIN 53 156)
CH=Crosshatch test (DIN 53 151)
GG60°≮=Gardner gloss measurement (ASTM-D 5233)
Imp. rev.=Impact reverse in g.m
HK=König hardness in sec (DIN 53 157)

TABLE 3

C1 Pigmented Powder Coatings

| | Example C1 Formulation | | | | | | | | | | | |
|---|---|---|---|---|---|---|---|---|---|---|---|---|
| | 1 | 2 | 3 | 4 | 5 | 6** | 7 | 8 | 9 | 10 | 11 | 12 |
| Crosslinking agent acc. to A Table 1 Example () | 23.8 (1) | 13.1 (3) | 22.6 (3) | 23.7 (4) | 22.8 (4) | 19.2 (4) | 28.2 (5) | 18.4 (8) | 23.3 (8) | 14.5 (9) | 26.4 (10) | 20.2 (10) |
| Polyester acc. to B1 | — | — | — | 76.3 | — | — | 71.2 | — | — | — | 73.6 | — |
| Polyester acc. to B2 | — | 86.9 | — | — | — | — | — | — | — | 85.5 | — | — |
| Polyester acc. to B3 | — | — | — | — | — | — | — | 81.6 | — | — | — | 79.8 |
| Polyester acc. to B4 | 76.2 | — | 77.4 | — | 77.2 | 80.8 | — | — | 76.7 | — | — | — |

Notes:
All formulations contain 40% by weight of TiO₂ (white pigment) and 0.5% by weight each of leveling agent and benzoin; the OH/NCO ratio is 1:1, o) 1:0.8; x) 0.1% by weight DBTL Coatings data

| LT | 64–73 | 67–77 | 71–83 | 67–81 | 72–88 | 69–81 | 65–79 | 74–89 | 67–86 | 69–75 | 64–77 | 67–81 |
|---|---|---|---|---|---|---|---|---|---|---|---|---|
| GG 60"≮ | 90 | 90/91 | 89/90 | 89 | 90 | 90 | 89/90 | 89/90 | 89/91 | 90/91 | 89 | 89/91 |
| CH | 0 | 0 | 0 | 0 | 0 | 0 | 0 | 0 | 0 | 0 | 0 | 0 |
| EI | >10 | >10 | >10 | >10 | >10 | >10 | 9.7/10 | >10 | >10 | >10 | >10 | >10 |
| Imp. rev. | 460.8 | 345.6 | 576 | 576 | 691.2 | 345.6 | 460.8 | 806.4 | >944.6 | 691.2 | 576 | 806.4 |

Notes
Curing conditions: 180° C./6–8', 170° C./10–12', 160° C./15–25', 150° C./25–30'

| | Example C1 Formulation | | | | | | | | | | | |
|---|---|---|---|---|---|---|---|---|---|---|---|---|
| | 13 | 14*** | 15 | 16 | 17*** | 18 | 19 | 20 | 21 | 22 | 23 | 24*** |
| Crosslinking agent acc. to A Table 1 Example () | 24.2 (11) | 20.3 (11) | 25.6 (13) | 17.1 (14) | 14.1 (14) | 26.7 (15) | 21.9 (16) | 26.4 (18) | 26.7 (20) | 14.2 (23) | 23.9 (24) | 20.1 (24) |
| Polyester acc. to B1 | — | — | 74.4 | — | — | — | — | — | — | — | — | — |
| Polyester acc. to B2 | — | — | — | 82.9 | 85.9 | — | — | — | — | 85.8 | — | — |
| Polyester acc. to B3 | — | — | — | — | — | — | 78.1 | — | — | — | — | — |
| Polyester acc. to B4 | 75.8 | 79.7 | — | — | — | 73.3 | — | 73.6 | 73.3 | — | 76.1 | 79.9 |

Notes:
All formulations contain 40% by weight of TiO₂ (white pigment) and 0.5% by weight each of leveling agent and benzoin; the OH/NCO ratio is 1:1, o) 1:0.8; x) 0.1% by weight DBTL Coatings data

| LT | 62–66 | 57–68 | 67–81 | 67–81 | 64–79 | 52–67 | 63–78 | 71–84 | 74–89 | 59–73 | 64–88 | 61–83 |
|---|---|---|---|---|---|---|---|---|---|---|---|---|
| GG 60"≮ | 90/91 | 90 | 88/89 | 90 | 90 | 91 | 89/90 | 89/90 | 90 | 90 | 90 | 90/91 |
| CH | 0 | 0 | 0 | 0 | 0 | 0 | 0 | 0 | 0 | 0 | 0 | 0 |
| EI | >10 | >10 | >10 | >10 | >10 | >10 | >10 | 9.6/9.9 | >10 | 9.7/9.9 | >10 | >10 |
| Imp. rev. | >944.6 | 576 | 345.6 | 806.4 | 460.8 | >944.6 | 460.8 | 460.8 | 576 | 345.6 | 576 | 691.2 |

Notes
Curing conditions: 180° C./6–8', 170° C./10–12', 160° C./15–25', 150° C./25–30'

C2 Transparent Powder Coating
Following the procedure described, the transparent powder coatings too were prepared, applied and baked at between 180 and 140° C.

| | Example C2 Formulation | | | | | | | | |
|---|---|---|---|---|---|---|---|---|---|
| | 1 | 2 | 3** | 4 | 5 | 6 | 7 | 8** | 9 |
| Crosslinking agent acc. to A Table 1 () | 13.9 (1) | 22.8 (4) | 22.8 (4) | 13.7 (8) | 23.3 (8) | 23.7 (10) | 15.9 (15) | 15.9 (15) | 23.9 (24) |
| Polyester acc. to B2 | 86.1 | — | — | 86.3 | — | — | 84.1 | 84.1 | — |

-continued

C2 Transparent Powder Coating
Following the procedure described, the transparent powder coatings too were prepared, applied and baked at between 180 and 140° C.

| | Example C2 Formulation | | | | | | | | |
|---|---|---|---|---|---|---|---|---|---|
| | 1 | 2 | 3** | 4 | 5 | 6 | 7 | 8** | 9 |
| Polyester acc. to B4 | — | 77.2 | 77.2 | — | 76.7 | 76.3 | — | — | 76.1 |

Notes:
All formulations contain 0.5% by weight each of leveling agent and 0.3% by weight of benzoin; the OH/NCO ratio is 1:1, o) 1:0.8; x) 0.1% by weight DBTL Coating data

| | | | | | | | | | |
|---|---|---|---|---|---|---|---|---|---|
| LT | 45–60 | 60–73 | 53–67 | 57–71 | 66–78 | 63–73 | 58–70 | 61–74 | 59–71 |
| HK | 191 | 194 | 197 | 198 | 214 | 195 | 197 | 199 | 207 |
| CH | 0 | 0 | 0 | 0 | 0 | 0 | 0 | 0 | 0 |
| EI | >10 | >10 | >10 | >10 | >10 | >10 | >10 | >10 | >10 |

Notes
Curing conditions: 180° C./5', 170° C./6–9', 160° C./10–15', 150° C./15–25', 140° C./25–30';

Obviously, numerous modifications and variations of the present invention are possible in light of the above teachings. It is therefore to be understood that within the scope of the appended claims, the invention may be practiced otherwise than as specifically described herein.

This application is based on German patent application 196 26 886.9 filed in the German Patent Office on Jul. 4, 1996 the entire contents of which are hereby incorporated by reference.

What is claimed is:

1. A polyurethane powder coating comprising a partially or totally 1,2,4-triazole-blocked polyisocyanate and a hydroxyl-containing polyester, wherein the blocked polyisocyanate is a physical mixture of (1) an aliphatic urethane- or isocyanurate-functional polyisocyanate and (2) a (cyclo) aliphatic or cycloaliphatic urethane-or isocyanurate-functional polyisocyanate, wherein the physical mixture of the polyisocyanates contains no mixture of two or more isocyanurate-functional polyisocyanates, wherein the isocyanate groups are blocked in such a way that there is from 0.5 to 1 mol of 1,2,4-triazol per isocyanate equivalent, and the ratio by weight of aliphatic to (cyclo)aliphatic and cycloaliphatic polyisocyanates is from 90 to 10 to 10 to 90, and the hydroxyl-containing polyester has a functionality of $\geq 2$, an OH number of from 30 to 150 mg KOH/g, a viscosity <40,000 mPa.s at 160° C. and a melting point of from 75 to 100° C., and wherein either (A) component (1) is an aliphatic isocyanurate-functional polyisocyanate, or (B) component (2) is a cycloaliphatic urethane-functional polyisocyanate, or (C) component (2) is a cycloaliphatic isocyanurate-functional polyisocyanate.

2. The polyurethane powder coating of claim 1, wherein component (1) is an aliphatic urethane-functional polyisocyanate, and wherein (A) component (2) is a cycloaliphatic urethane-functional polyisocyanate, or (B) component (2) is a cycloaliphatic isocyanurate-functional polyisocyanate.

3. The polyurethane powder coating of claim 1, wherein component (1) is an aliphatic isocyanurate-functional polyisocyanate.

4. The polyurethane powder coating of claim 1, wherein component (2) is a cycloaliphatic urethane-functional polyisocyanate.

5. The polyurethane powder coating of claim 1, wherein component (2) is a cycloaliphatic isocyanurate-functional polyisocyanate.

6. The polyurethane powder coating of claim 2, wherein component (2) is a cycloaliphatic urethane-functional polyisocyanate.

7. The polyurethane powder coating of claim 2, wherein component (2) is a cycloaliphatic isocyanurate-functional polyisocyanate.

8. The polyurethane powder coating of claim 3, wherein component (2) is (cyclo)aliphatic polyisocyanate.

9. The polyurethane powder coating of claim 3, wherein component (2) is a cycloaliphatic urethane-functional polyisocyanate.

* * * * *